United States Patent [19]

Knabe

[11] 4,440,201
[45] Apr. 3, 1984

[54] LIQUID DISCHARGE NOZZLE FOR CONTAINER FILLING VALVES

[75] Inventor: Uwe Knabe, Holzwickede, Fed. Rep. of Germany

[73] Assignee: Holstein & Kappert GmbH, Dortmund, Fed. Rep. of Germany

[21] Appl. No.: 320,715

[22] Filed: Nov. 12, 1981

[30] Foreign Application Priority Data

Dec. 5, 1980 [DE] Fed. Rep. of Germany ....... 3045854

[51] Int. Cl.³ .............................................. B67C 3/06
[52] U.S. Cl. .................................. 141/286; 141/392
[58] Field of Search ...................... 141/37, 39, 40, 46, 141/47, 48, 285–310

[56] References Cited

U.S. PATENT DOCUMENTS 3,757,835  9/1973  Copping .............................. 141/286

Primary Examiner—Houston S. Bell, Jr.
Attorney, Agent, or Firm—Michael J. Striker

[57] ABSTRACT

A liquid discharge nozzle for container filling valves includes an inner member and an outer member which together define an upstream section of a passage for the flow of the liquid to be filled into a container therethrough in the downward direction. The outer member has a valve seat cooperating with a valve member to open or close the passage. The outer member forms a groove which accommodates the lower part of the inner member to form a siphon-type trap therewith, the groove being separated from a downstream section of the passage, which is situated in the discharge nozzle portion of the outer member, by a ridge. A plurality of openings, such as notches or bores, is provided through the ridge in substantially radial directions, each of the openings extending from the groove to slightly upwardly of the valve seat. The openings have such dimensions that surface tension of the liquid present therein prevents gases from penetrating through such openings into the upstream section of the passage.

7 Claims, 4 Drawing Figures

LIQUID DISCHARGE NOZZLE FOR CONTAINER FILLING VALVES

BACKGROUND OF THE INVENTION

The present invention relates to arrangements for filling containers with liquids in general, and more particularly to a discharge nozzle of a container filling valve.

In the known filling machines which are equipped with filling elements which do not contain a filling tube, the liquid flows, after the opening of a liquid flow interrupting valve, along a guiding tube on which there is mounted a flow-deflecting shield which deflects the flow of the liquid away from the guiding tube and toward the inner surface of the circumferential wall of the container being filled with the liquid. The volume of gas which is displaced by the liquid is removed from the container being filled through a gas tube. The rising upper level of the liquid in the container will eventually interrupt the access of the gas to the gas tube, and further flow of the liquid into the container is thus terminated.

Consequently, the gas tube simultaneously performs the function of the filling volume limiter. The gas remaining in the filled container has a tendency, so long as the filling valve is still open, to escape through the column of liquid present upwardly thereof in the upward direction. If this were permitted to happen, the same volume of liquid as that of the escaping gas would flow into the container, so that the liquid contents thereof would be greater than desired. For this reason, a gas trap is ordinarily interposed at a suitable location between the liquid flow interrupting valve and the deflecting shield. The gas trap may be constructed, for instance, as a wire mesh screen. The mesh aperture size of this wire mesh screen is so selected that the surface tension force of the liquid present upwardly of the wire mesh screen between the individual wires exceeds the upwardly directed buoyancy force of the gas. While this wire mesh screen achieves excellent results when the liquid being filled into the container is clear, in that it lets such liquid pass therethrough without any hindrance, it fails when the liquid to be filled into the container carries solid matter, as is the case, for instance, with fruit juices or similar beverages containing fruit or vegetable fibers or tissue. If it were attempted to use the wire mesh screen in conjunction with such liquids, the fibers or similar solid ingredients would soon clog the apertures of the wire mesh screen. This means that filling elements of a different construction must be used for filling containers with liquids of this type.

One construction which has been found to give excellent results under these circumstances includes a filling or liquid discharge valve which includes a siphon-type trap. A valve of this construction usually includes, immediately upwardly of its discharge tube and also upwardly and upstream of its valve seat with an annular depression or groove, into which there extends an also annularly configurated inner tube. When the valve is constructed in this manner, the liquid will be able to flow between the external valve housing and the internal tube into the siphon-type trap, and through the latter into the discharge tube, while the gas remaining in the container will not be able to flow through the siphon-type trap in the opposite direction, even if the valve member of this valve is still spaced from the valve seat.

This construction of the discharge or filling valve is suited for use with many types of liquids, that is, not only with those which contain solid ingredients, but also with those which are clear. However, this construction also has a quite disturbing drawback, which results from the provision of the siphon-type fluid-flow diversion caused by the provision of the necessary web or inner tube at the region of the annular groove. This results in the formation of turbulent flow conditions in the flow of the liquid toward the container being filled which, in turn, decreases the throughput of the filling valve and, consequently, increases the time which is needed for filling the container.

SUMMARY OF THE INVENTION

Accordingly, it is a general object of the present invention to avoid the disadvantages of the prior art.

More particularly, it is an object of the invention to provide a filling valve for filling containers with liquids of different properties, which filling valve is not possessed of the disadvantages of the conventional filling valves of this type.

Still more particularly, it is an object of the present invention to so construct the filling valve of the type here under consideration as to improve the flow conditions at the region of the siphon-type trap.

It is yet another object of the invention to so design the siphon-type trap of the filling valve as to improve the liquid flow throughput through the filling valve, without sacrificing the advantages of the conventional siphon-type traps.

A concomitant object of the present invention is to develop an improved siphon-trap filling or discharge valve which is simple in construction, inexpensive to manufacture, easy to use, and reliable in operation nevertheless.

In pursuance of these objects and others which will become apparent hereafter, one feature of the present invention resides in a liquid discharge nozzle for a container filling valve which, briefly stated, comprises an inner member centered on a substantially vertical axis and having a lower end; a hollow outer member surrounding and bounding a passage for downward flow of liquid with the inner member and having a valve seat and a ridge which delimits an annular groove partially receiving the lower end of the inner member upstream of the valve seat in the passage; and means defining at least one opening extending through the ridge from the groove to slightly upwardly of the valve seat. Advantageously, the inner member is tubular. It is also advantageous when the opening extends substantially radially through the ridge, and when the defining means defines a plurality of additional openings distributed about the ridge relative to one another and to the aforementioned one opening. It is especially advantageous when the openings are regularly or uniformly distributed.

In one advantageous construction of the discharge nozzle according to the present invention, the openings are upwardly open notches in the ridge. However, it is also advantageous when, in accordance with another concept of the present invention, the openings are constructed as circumferentially complete holes or bores through the ridge.

The novel features which are considered as characteristic of the invention are set forth in particular in the appended claims. The improved discharge nozzle for container filling valve itself, however, both as to its construction and its mode of operation, together with

DETAILED DESCRIPTION OF THE PREFERRED EMBODIMENTS

Figure 1:
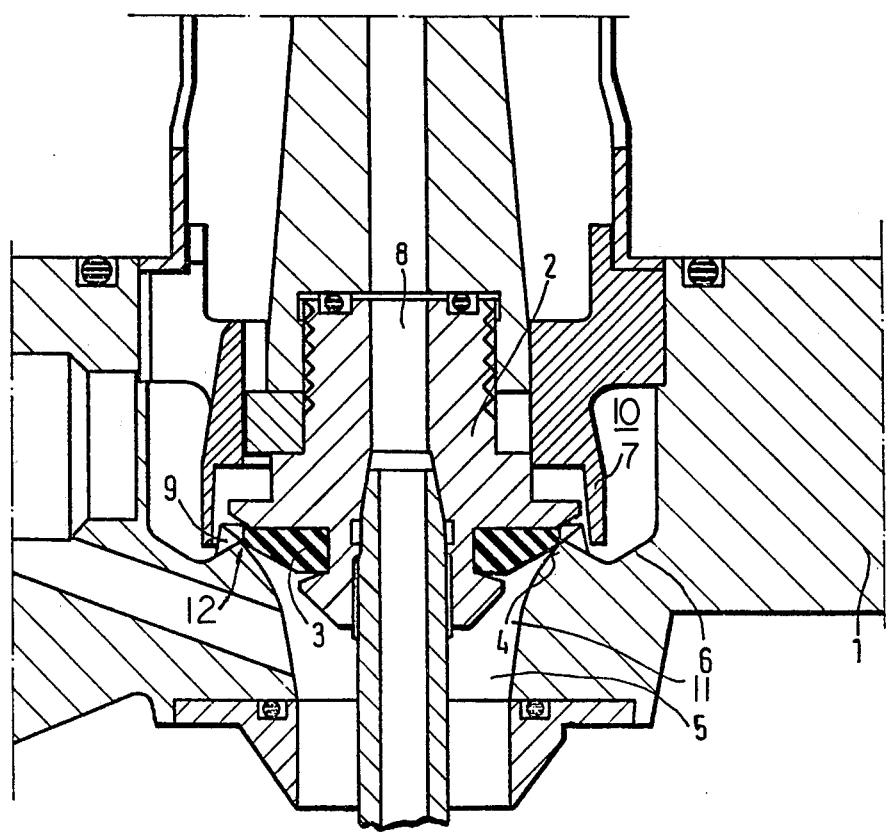
FIG. 1 is a partially sectioned view of a container filling valve equipped with a discharge nozzle constructed in accordance with the present invention and illustrating a ridge provided with openings.

Referring now to the drawing in detail, it may be seen that it illustrates only that part of the filling valve which incorporates the present invention. The illustrated part of the filling valve includes a valve housing 1 which constitutes a hollow outer member of a discharge portion or nozzle of the filling valve. A valve shank 2 is guided in the valve housing 1 for movement in its axial direction which coincides with the axial direction of the valve housing 1 and of the entire valve and which is substantially vertical. The valve shank or stem 2 carries a sealing element 3 which, in the illustrated closed position of the filling valve, sealingly engages a valve seat 4. The valve seat 4 is provided on a liquid discharge nozzle or tube 5 of the valve housing 1. A siphon-type trap or lock is arranged upwardly of the valve seat 4. The siphon-type trap includes an annular depression or groove 6, and an inner tube 7 which has an annular lower end portion which extends into the groove 6 and which acts as a closing or separating member.

The groove 6 is situated at the lower end of an upstream portion 10 of a passage for the flow of the respective liquid to be filled into a container therethrough and is separated from a downstream section 11 of the passage by a ridge 12. The upstream section 10 of the passage is defined between the inner tube 7 and the outer hollow member or valve housing 1, while the downstream section 11 of this passage is situated within the liquid discharge tube or nozzle 5.

Figure 2:
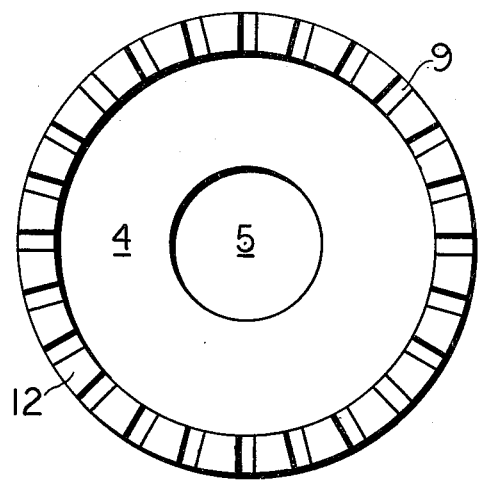
FIG. 2 is a top view onto the ridge and in particular illustrating the openings according to FIG. 1.

As can be seen from FIG. 2, the ridge 12 is provided with a plurality of openings 9 which extend in substantially radial directions from the annular groove or depression 6 across the ridge 12 to slightly upwardly of the valve seat 4, as shown in FIG. 1. In other words, the openings 9 are substantially aimed at an axis 8 of the discharge nozzle or tube 5.

Figure 3:
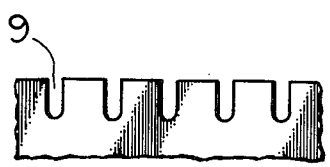
FIG. 3 is a cross-sectional view of a first embodiment of the openings according to FIG. 2.

The openings 9 can be shaped, as shown, as notches or grooves, and are preferably of U-shape, as can be seen from FIG. 3. These notches are formed at the upper part of the ridge 12 and are upwardly open. The dimensions of the notches 9 are such as to assure sufficient surface tension forces of the liquid in such notches 9, in order to prevent flow of gas through the notches 9 opposite to the direction of flow of the liquid.

It is conceivable and contemplated by the present invention to give these notches 9 a slight tangential slant, so that the liquid being filled into the container, which has a slight spinning effect, can be discharged from the nozzle 5 in an especially advantageous manner.

Figure 4:
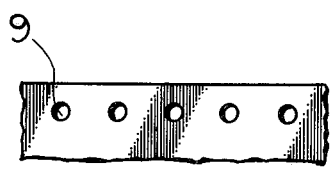
FIG. 4 is a cross-sectional view of a second embodiment of the openings illustrating them as through bores in the ridge.

The openings 9, instead of being configurated as the above-discussed notches, can also be advnatageously configurated as through bores or holes in the ridge 12 as can be seen from FIG. 4. These bores 9 are circumferentially complete, that is, they are not upwardly open. Even here, the dimensions of the bores 9, and particularly their diameter, will be so selected as to satisfy the above-discussed requirement for sufficient surface tension.

It will be understood that each of the elements described above, or two or more together, may also find a useful application in other types of arrangements differing from the type described above.

While the invention has been illustrated and described as embodied in a discharge nozzle for a container filling valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptation should and are intended to be comprehended within the meaning and range of equivalence of the claims.

What is claimed as new and desired to be protected by Letters Patent is set forth in the appended claims.

I claim:

1. A liquid discharge nozzle for a container filling valve, comprising an inner member centered on a substantially vertical axis and having a lower end; a hollow outer member surrounding and bounding a passage for downward flow of liquid with said inner member and having a valve seat and a ridge which delimits an annular groove which partially receives said lower end of said inner member upstream of said valve seat in said passage and therefore prevents escape of a gas through the liquid, but at the same time tends to cause turbulence of the liquid; and means defining at least one opening which extends through said ridge from said groove to slightly upwardly of said valve seat and eliminates the turbulence of the liquid.

2. The nozzle as defined in claim 1, wherein said inner member is tubular.

3. The nozzle as defined in claim 1, wherein said opening extends substantially radially through said ridge.

4. The nozzle as defined in claim 1, wherein said defining means defines a plurality of additional openings distributed about said ridge relative to one another and to said one opening.

5. The nozzle as defined in claim 4, wherein said openings are regularly distributed.

6. The nozzle as defined in claim 4, wherein said openings are upwardly open notches in said ridge.

7. The nozzle as defined in claim 4, wherein said openings are circumferentially complete holes through said ridge.

* * * * *